United States Patent [19]

Cincotta et al.

[11] Patent Number: 5,114,104

[45] Date of Patent: May 19, 1992

[54] ARTICULATED CONTROL SURFACE

[75] Inventors: Manuel Cincotta, Tiverton; Richard H. Nadolink, Portsmouth, both of R.I.

[73] Assignee: The United States of America as represented by the Secretary of the Navy, Washington, D.C.

[21] Appl. No.: 591,532

[22] Filed: Oct. 1, 1990

[51] Int. Cl.[5] .................... B64C 3/44; B63H 25/06
[52] U.S. Cl. .................... 244/219; 244/75 R; 114/162; 114/152
[58] Field of Search ............ 244/75 R, 219; 114/140, 114/280, 162, 152

[56] References Cited

U.S. PATENT DOCUMENTS 3,042,371 7/1962 Fanti .................................. 244/219
3,930,626 1/1976 Croswell, Jr. ..................... 244/219

Primary Examiner—Joseph F. Peters, Jr.
Assistant Examiner—Carla Mattix
Attorney, Agent, or Firm—Michael J. McGowan; Prithvi C. Lall; Michael F. Oglo

[57] ABSTRACT

An articulated control surface for flight control utilizes a moldable control surface that is shaped by contracting and elongating shape memory alloys embedded within the control surface. The shape memory alloys contract when heated via an applied electric current and elongate when cooled, i.e., the electric current is removed. The resulting control surface is capable of generating a curved control surface without any electro/mechanical or hydraulic control systems.

3 Claims, 2 Drawing Sheets

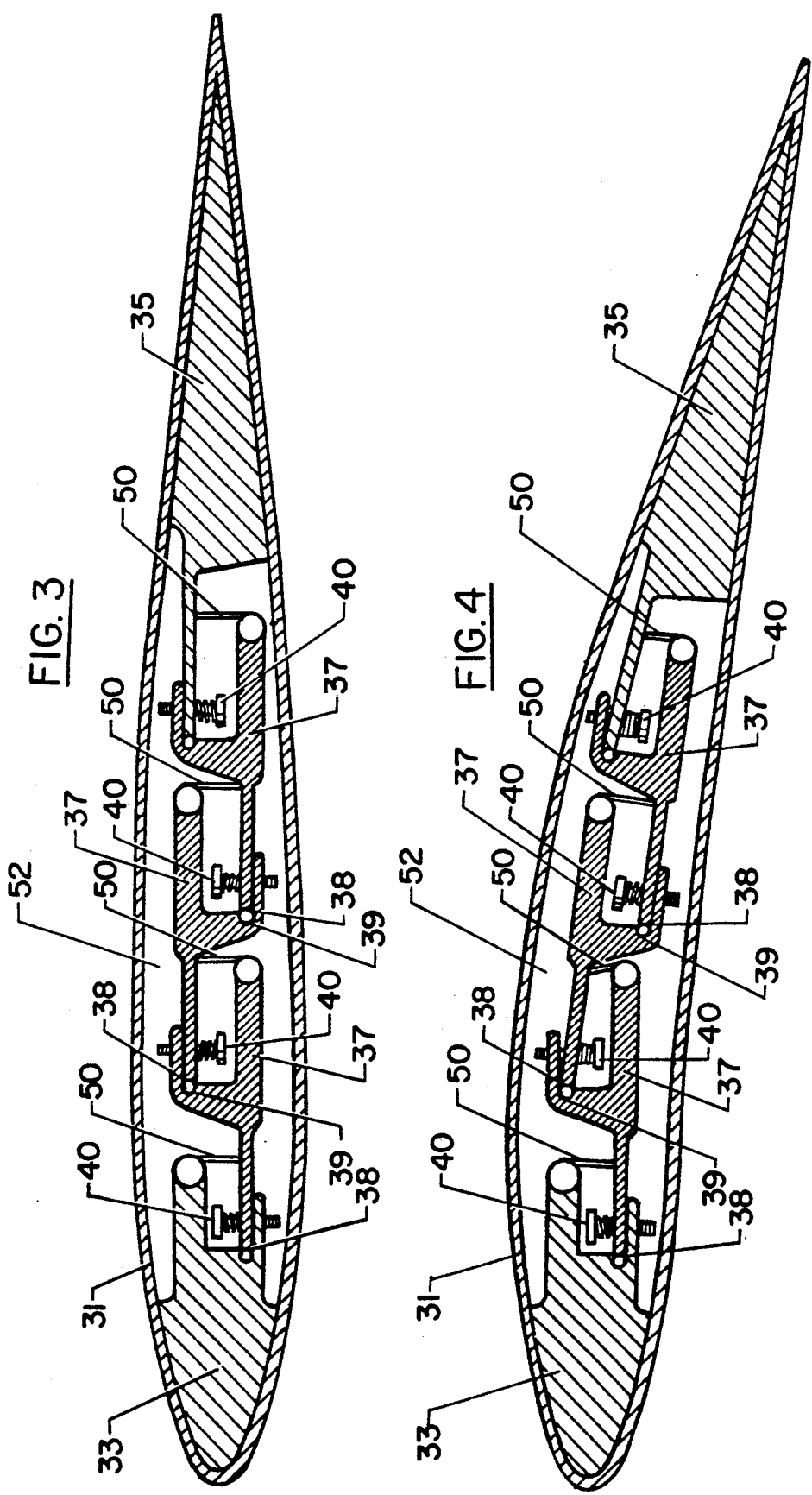

ARTICULATED CONTROL SURFACE

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION (1) Field of the Invention

The present invention generally relates to control surfaces and more particularly to an articulated control surface system for creating a curved control surface.

(2) Description of the Prior Art

It is well known that control surface actuator noise as well as flow separation induced noise created by current "rigid" control surfaces are significant sources of unwanted noise on underwater and airborne vehicles. The rigid nature of these control surfaces increases the size of the turbulent wake behind the control surface thereby generating significant flow noise levels. The flow noise is created by two mechanisms: (1) the turbulence directly radiating to the near and far field, and (2) the induced noise due to the turbulent excitation of the control surface and the surrounding structure. The latter causes fin and structure reradiation which is the dominant flow noise source.

A variety of techniques have been used to reduce the amount of noise created by existing electro/mechanical actuators. In general, these efforts have concentrated on balancing and isolating the moving parts and gears as well as providing fixed hydro/aerodynamic fairings. Unfortunately, even in the best designs, prior art electro/mechanical actuator-driven control surfaces suffer from the following drawbacks:

(1) Electro/mechanical, hydraulic or pneumatic activation of the control surface resulting in gear and motor noise;

(2) Significant size and weight of actuators add to the overall size and weight of the vehicle, while the seals and bearings associated with these actuators impose concurrent depth limitations and require precise machining tolerances;

(3) Limited control surface placement possibilities since the control surface must have through-hull drives for electro/mechanical or hydraulic actuator systems;

(4) Control hinge gap interrupting flow over the control surface and causing flow separation; and (5) Increased shed vorticity and turbulent wake created by the rigid control surface, thereby inducing turbulent excitation of the rigid control surface.

(6) The flow is disturbed in the wake of control surfaces where typical propulsors, i.e. propellers, are located thereby greatly contributing to turbulence ingestion noise.

SUMMARY OF THE INVENTION

Accordingly, it is an object of the present invention to provide an improved control surface system for use in producing lift forces to aid in the maneuvering of any type of vehicle.

It is a further object of the present invention to provide a control surface system that overcomes the drawbacks of the aforementioned prior art electro/mechanical, hydraulic or pneumatic designs.

It is a further object of the present invention to provide a variable camber control surface having low shed vorticity and low induced drag.

Other objects and advantages of the present invention will become more apparent hereinafter in the specification and drawings.

The above objects are realized by providing a control surface system that can shape a moldable control surface without the use of electro/mechanical or hydraulic actuator systems. The moldable control surface has a plurality of shape memory alloys, such as BioMetal TM fibers, attached thereto. The BioMetal TM fibers contract upon heating therefore shaping the moldable control surface in a smooth and continuous curve. Typically, the fibers are heated through application of electrical voltage. When the electrical voltage is removed, the fibers elongate as they cool, thereby returning the moldable control surface to its original shape. A static spring may be embedded within the moldable control surface to aid in the recovery of the control surface to its original position as the fibers cool.

BRIEF DESCRIPTION OF THE DRAWING(s)

FIG. 3 shows a cross-sectional view of another embodiment of the present invention as it applies to a foil having zero camber; and FIG. 4 shows a cross-sectional view of the foil of FIG. 3 having a variable camber according to the present invention.

DESCRIPTION OF THE PREFERRED EMBODIMENT

Figure 1:
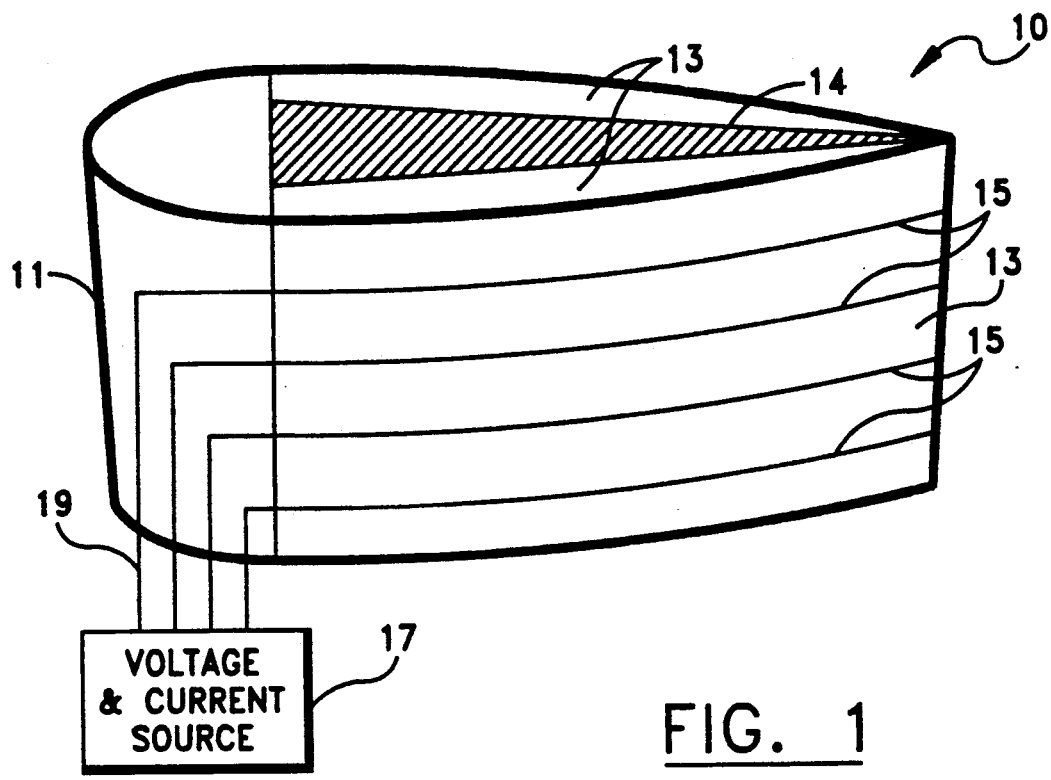
FIG. 1 shows a perspective view of the control surface system according to the present invention.

Referring now to the drawings and in particular to FIG. 1, a control surface system 10 according to the present invention is shown. For purposes of description only, the control surface system 10 will be an underwater control surface; however, the invention is not so limited. In fact, as will be apparent, the principles of the present invention apply equally as well to an airborne control surface.

The control surface system 10 in one embodiment utilizes a rigid leading edge 11 attached to a moldable control surface 13. The rigid leading edge 11 allows the variable camber feature of this invention to also provide variable incidence by fixing the leading edge 11 of the control surface 13 and then varying the degree of curvature along the span of the control surface 13. This variable incidence effect is necessary in applications such as rotors or fans. In other applications, where a rigid leading edge is not required, the entire surface may be molded in a continuous smooth camber, thereby varying the degree of curvature along the chord.

The moldable control surface 13 is typically a flexible elastomeric material that retains its resiliency when heated and for numerous shapings. A static spring 14 may also be embedded within moldable control surface 13 in order to help retain the shape of control surface 13. The necessity of static spring 14 is dependent upon the choice of elastomeric material for control surface 13 as well as operational movement requirements of the control surface 13. For example, if the material chosen for the control surface 13 had a relatively high modulus of elasticity or was not required operationally to quickly "spring back" to its original shape, a static spring 14 may not be necessary.

Figure 2:
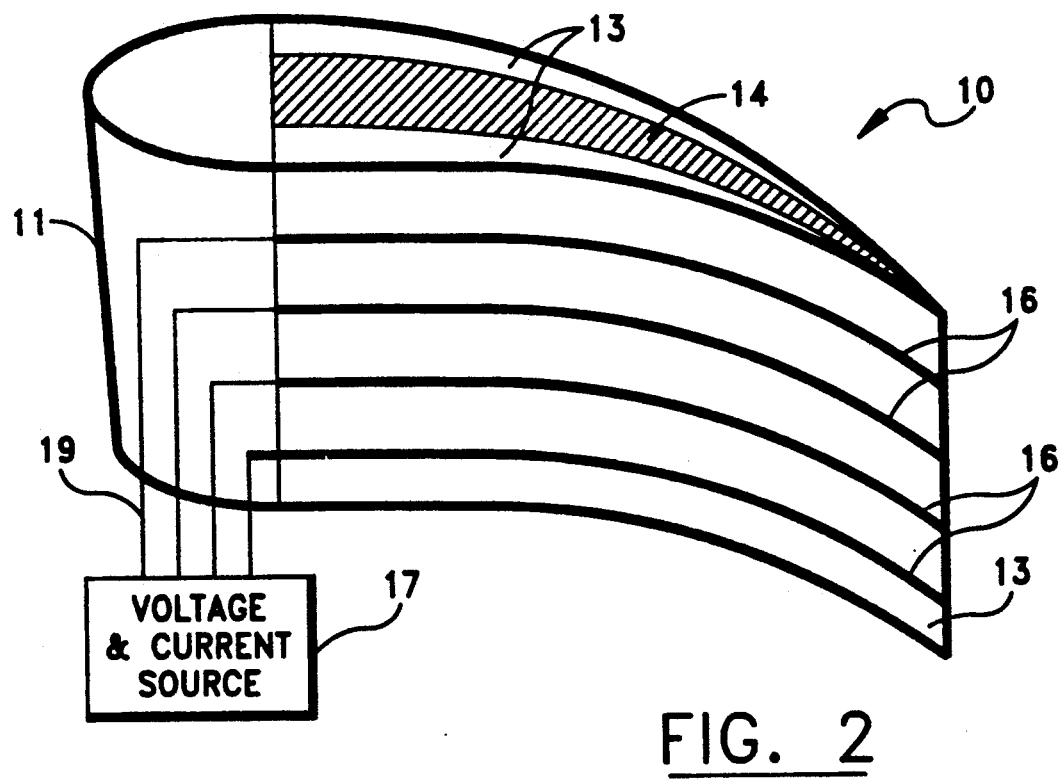
FIG. 2 shows a perspective view of the control surface system after it has been shaped.

Embedded within the surface of the moldable control surface 13 are a plurality of shape memory alloy fibers 15 attached to wider material strips 16 shown in FIG. 2. Strips 16 are "hard" only with respect to the flexible elastomeric material used for moldable control surface 13. While only one side is shown in FIG. 1, fibers 15 attached to strips 16 are embedded in the control surface 13 on both sides of control surface 13. A voltage and current source 17, hereinafter referred to as electric source 17, is used to supply electric power via wires 19 to the shape memory alloy fibers 15.

A shape memory alloy is one that changes its internal molecular structure at certain temperatures. Macro movement of the alloy is obtained by cycling the alloy between two temperatures. Shape memory alloys in the form of fibers are now available which retain their shape memory characteristics for millions of cycles. Electric current can be used to generate heat and a resulting temperature change in the shape memory alloy which results in a change of length of the shape memory alloy. One such shape memory alloy is BioMetal TM manufactured by Toki Corporation of America, Irvine, Calif. For purposes of description only, shape memory alloy fibers 15 will be BioMetal TM fibers for an underwater control surface system residing in water having a temperature in the range of 34° to 100° F. However, the invention might make use of any one of the many shape memory alloys available today depending upon environment and design constraints. BioMetal TM elongates from 3% to 7% of its original length when heated and generates a force of approximately 400 grams.

The standard size of a BioMetal TM fiber is 0.15 mm in diameter; however, the invention is not limited to this size fiber. Indeed, shape memory alloy fibers might be any size diameter. The fibers 15 might also be a continuous sheet of a shape memory alloy, depending on design constraints. The fibers 15 might also be a variety of shape memory alloys, each having various shape memory characteristics depending on the type of shape desired from control surface 13.

In operation, when electrical source 17 applies current to the shape memory alloy fibers 15 on one side of the control surface 13, the fibers 15 attached to strips 16 contract to cause a curved shape in control surface 13 as shown in FIG. 2. Like reference numerals have been used for like elements in FIGS. 1 and 2. Naturally, the curve of control surface 13 would be reversed if the current were applied to the fibers 15 on the other side of control surface 13. Strips 16 must be hard enough such that they provide a surface upon which the contraction-/expansion of fibers 15 can act.

When the electrical source 17 is disconnected from fibers 15, the fibers 15 cool in an ambient or forced water stream to once again elongate to their original size. Should the cooling from ambient water be insufficient, an external cooling means (not shown) could be used. As mentioned above, the optional static spring 14 may be embedded within control surface 13 to supply a bias force to return control surface 13 to its original shape as the fibers 15 cool. Thus, with the fibers 15 and strips 16 appropriately embedded in the elastomeric control surface 13, controllable and variable movement of that control surface 13 will result.

FIG. 3 shows a cross-sectional view of an alternative embodiment of the present invention as applied to a foil 30. Foil 30 has an elastomer skin 31 forming a moldable control surface. The leading and trailing edges 33 and 35, respectively, within skin 31 of foil 30 are typically a rigid material with respect to the elastomer skin 31. A plurality of spring-loaded hinges 37 are functionally connected to one another within the elastomer skin 31. The spring-loaded hinges 37 also functionally connect the leading and trailing edges 33 and 35, respectively.

Each hinge 37 has a leading edge hinge point 38 and a trailing edge hinge point 39 such that a trailing edge hinge point 39 of one hinge is functionally connected to the leading edge hinge point 38 of the next hinge 37. Each hinge further has a spring-loaded pin 40 for maintaining spring communication between successive hinges. Shape memory alloy fiber bundles 50 are provided to also functionally connect each hinge 37. Each fiber bundle 50 is shown in its expanded or cooled state. A heat transfer fluid is provided in the space 52 around the hinges 37 and fiber bundles 50 as defined by elastomer skin 31 and leading and trailing edges 33 and 35, respectively.

As shown in FIG. 4, when the fiber bundles 50 contract from an increased temperature of the heat transfer fluid, a variable camber foil 30 results. Each hinge 37 pivots about its leading and trailing edge hinge points 38 and 39, respectively. The amount of camber can be adjusted by the temperature of the heat transfer fluid and the spring forces applied by spring-loaded pins 40.

The advantages of the present invention are numerous. By utilizing a shape memory alloy that changes shape in response to electrical impulses, the shape changes of the control surface can be tailored to create a continuous curved control surface. The shape change eliminates problems associated with fixed surfaces in that the control surface can be adapted to varying loads with less separation, less wake turbulence, less drag, and reduced noise. Additionally, the continuous curvature of the surface provides improved performance compared to conventional hinged-surfaces while also achieving less separation, less wake turbulence, less drag and reduced noise. Accordingly, the present invention could also be used on high-speed ground and water effect vehicles. These vehicles have horizontal wings to curtail body lift during high-speed cornering.

A further advantage of this invention is that the actuating mechanism is completely contained within the control surface. Thus, no conventional electro/mechanical or hydraulic devices are required to provide hydro/aerodynamic turning forces. The present invention eliminates typical through-hull drives and allows essentially universal placement of the control surfaces since only electrical power wires are required to create movement. The invention further has the great advantage of allowing placement of the control surfaces behind the propulsion system of the vehicle thereby reducing noise and improving efficiency. The operation of the control surfaces is essentially silent and since they provide a curved control surface, the flow induced noise is greatly reduced.

Thus, it will be understood that various changes in details, materials, steps and arrangement of parts, which have been herein described and illustrated in order to explain the nature of the invention, may be made by those skilled in the art within the principle and scope of the invention as expressed in the appended claims.

What is claimed is:
1. A control surface system comprising:
   a moldable control surface;

a shaping means including at least one Biometal ™ fiber for shaping said moldable control surface, said shaping means in mechanical communication with said molding surface wherein said shaping means contracts upon heating and expands upon cooling;

means for heating said shaping means; and at least one static spring means embedded in said moldable control surface.

2. A control surface system for creating a continuously variable, curved control surface in response to a control signal comprising:

a control surface;

a plurality of shape memory alloy materials in mechanical communication with said control surface, said shape memory alloy materials being capable of macro movement based upon internal molecular structure alteration whereby said macro movement creates the curved control surface;

means for altering the internal molecular structure of said shape memory alloy materials in response to the control signal; and at least one static spring embedded within said control surface, 3. A control surface system for ships operating in water having a temperature in the range of 34° to 100° F., comprising:

a moldable elastomeric control surface;

a plurality of Biometal ™ fibers in mechanical communication with said control surface;

means for cycling an electrical voltage across said plurality of Biometal ™ fibers wherein said Biometal ™ fibers, contract when the electrical voltage is applied and elongate when the electrical voltage is removed, whereby said control surface moves in accordance with said fiber contraction and elongation; and at least one static spring embedded within said control surface.

* * * * *